United States Patent
Siomina et al.

(10) Patent No.: US 9,775,063 B2
(45) Date of Patent: Sep. 26, 2017

(54) BANDWIDTH-BASED INITIATION OF HANDOVER FOR REFERENCE SIGNAL MEASUREMENTS

(75) Inventors: Iana Siomina, Solna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 414 days.

(21) Appl. No.: 13/979,892

(22) PCT Filed: Jan. 12, 2012

(86) PCT No.: PCT/SE2012/050020
§ 371 (c)(1),
(2), (4) Date: Jul. 16, 2013

(87) PCT Pub. No.: WO2012/112102
PCT Pub. Date: Aug. 23, 2012

(65) Prior Publication Data
US 2013/0303170 A1   Nov. 14, 2013

Related U.S. Application Data

(60) Provisional application No. 61/443,120, filed on Feb. 15, 2011.

(51) Int. Cl.
*H04W 24/10* (2009.01)
*G01S 5/02* (2010.01)
(Continued)

(52) U.S. Cl.
CPC .......... *H04W 24/10* (2013.01); *G01S 5/0205* (2013.01); *G01S 5/0236* (2013.01);
(Continued)

(58) Field of Classification Search
None
See application file for complete search history.

(56) References Cited

U.S. PATENT DOCUMENTS

| 5,276,907 A | 1/1994 | Meidan |
| 5,513,379 A | 4/1996 | Benveniste et al. |
| (Continued) | | |

FOREIGN PATENT DOCUMENTS

| GB | 2469028 A | 6/2010 |
| WO | 2009057729 A2 | 5/2009 |
| (Continued) | | |

OTHER PUBLICATIONS

3rd Generation Partnership Program; "Technical Specification Group Radio Access Network; Evolved Universal Terrestrial Radio Access (E-UTRA); Physical channels and modulation (Release 10)"; Dec. 2010; pp. 1-103; 3GPP TS 36.211 V10.0.0; Sophia Antipolis, Valbonne, France.

*Primary Examiner* — Hilina K Demeter
(74) *Attorney, Agent, or Firm* — Coats & Bennett, PLLC

(57) ABSTRACT

Processing implemented by a method and apparatus herein advantageously improves the quality of measurements performed by a wireless device (36), by ensuring that the device (36) measures its serving cell over at least as large of a bandwidth as the bandwidth over which it measures neighbor cells. Such processing specifically includes identifying, for each of a plurality of neighbor cells, a measurement bandwidth over which the wireless device (36) is to perform measurements of that cell. Processing then entails selectively initiating handover of the wireless device (36) from a serving cell to one of the neighbor cells, depending on how many of those neighbor cells have a measurement bandwidth larger than that of the serving cell. Thus, contrasted with traditional performance-based handovers that are conducted based on the strength of already made reference signal measurements, handover herein is performed based on the bandwidth(s) over which such measurements will be performed in the future.

23 Claims, 5 Drawing Sheets

(51) Int. Cl.
*H04W 24/00* (2009.01)
*H04W 36/00* (2009.01)
*H04W 72/08* (2009.01)
*H04W 72/12* (2009.01)
*H04W 4/02* (2009.01)
*H04W 72/04* (2009.01)
*H04L 5/00* (2006.01)
*H04W 64/00* (2009.01)
*H04B 17/27* (2015.01)
*H04B 17/318* (2015.01)
*H04B 17/382* (2015.01)

(52) U.S. Cl.
CPC ............ *H04L 5/0048* (2013.01); *H04W 4/023* (2013.01); *H04W 24/00* (2013.01); *H04W 36/0094* (2013.01); *H04W 72/0446* (2013.01); *H04W 72/082* (2013.01); *H04W 72/12* (2013.01); *H04B 17/27* (2015.01); *H04B 17/318* (2015.01); *H04B 17/382* (2015.01); *H04W 64/00* (2013.01)

(56) References Cited

U.S. PATENT DOCUMENTS

| | | | |
|---|---|---|---|
| 5,555,257 A | 9/1996 | Dent | |
| 5,724,380 A | 3/1998 | Ritter | |
| 5,812,940 A | 9/1998 | Lindell | |
| 6,128,490 A | 10/2000 | Shaheen et al. | |
| 7,477,659 B1* | 1/2009 | Nee | H04W 28/20 370/310 |
| 8,639,239 B2* | 1/2014 | Uemura | H04W 36/0088 455/423 |
| 8,676,212 B2* | 3/2014 | Ishii | H04W 36/0094 370/331 |
| 9,055,595 B2 | 6/2015 | Siomina et al. | |
| 2001/0022782 A1 | 9/2001 | Steudle | |
| 2003/0032441 A1 | 2/2003 | Ofuji et al. | |
| 2004/0162080 A1 | 8/2004 | Kostic et al. | |
| 2004/0203815 A1 | 10/2004 | Shoemake et al. | |
| 2005/0176432 A1* | 8/2005 | Kamura | H04L 43/022 455/436 |
| 2005/0250529 A1 | 11/2005 | Funnell et al. | |
| 2007/0097914 A1 | 5/2007 | Grilli et al. | |
| 2007/0298780 A1 | 12/2007 | Lindoff et al. | |
| 2008/0081598 A1 | 4/2008 | Chandra et al. | |
| 2008/0167041 A1* | 7/2008 | Wang | H04W 36/30 455/436 |
| 2009/0005029 A1 | 1/2009 | Wang et al. | |
| 2009/0191863 A1 | 7/2009 | Kazmi | |
| 2009/0280814 A1* | 11/2009 | Farnsworth | H04B 17/24 455/436 |
| 2010/0197310 A1* | 8/2010 | Jung | H04W 36/30 455/436 |
| 2010/0255834 A1* | 10/2010 | Ishii | H04W 36/0094 455/424 |
| 2010/0271965 A1* | 10/2010 | Siomina | H04L 5/0048 370/252 |
| 2010/0317343 A1 | 12/2010 | Krishnamurthy et al. | |
| 2010/0322079 A1 | 12/2010 | Kitazoe et al. | |
| 2010/0323688 A1* | 12/2010 | Kazmi | H04W 36/30 455/424 |
| 2011/0009095 A1 | 1/2011 | Uemura et al. | |
| 2011/0065433 A1* | 3/2011 | Iwamura | H04W 36/0088 455/434 |
| 2011/0143752 A1* | 6/2011 | Hong | H04W 48/18 455/428 |
| 2011/0281615 A1 | 11/2011 | Yamada et al. | |
| 2012/0046066 A1 | 2/2012 | Tamura et al. | |
| 2012/0069756 A1* | 3/2012 | Ji | H04W 36/0016 370/252 |
| 2012/0094651 A1 | 4/2012 | Chun et al. | |
| 2012/0100856 A1* | 4/2012 | Ishida | H04W 36/04 455/436 |
| 2012/0115459 A1 | 5/2012 | Deng et al. | |
| 2012/0115463 A1 | 5/2012 | Weng et al. | |
| 2012/0244903 A1 | 9/2012 | Fong et al. | |
| 2012/0307670 A1 | 12/2012 | Kazmi et al. | |
| 2012/0307769 A1 | 12/2012 | Fujita | |
| 2013/0033998 A1 | 2/2013 | Seo et al. | |
| 2014/0087733 A1* | 3/2014 | Ishida | H04W 36/0083 455/436 |

FOREIGN PATENT DOCUMENTS

| | | |
|---|---|---|
| WO | 2009096846 A1 | 8/2009 |
| WO | 2010151198 A1 | 12/2010 |
| WO | 2012112103 A1 | 8/2012 |

* cited by examiner

```
-- ASN1START

OTDOA-ProvideAssistanceData ::= SEQUENCE {
    otdoa-ReferenceCellInfo      OTDOA-ReferenceCellInfo        OPTIONAL,
    otdoa-NeighbourCellInfo      OTDOA-NeighbourCellInfoList    OPTIONAL,
    otdoa-Error                  OTDOA-Error                    OPTIONAL,
    ...
}

-- ASN1STOP
```

*FIG. 2*
*(PRIOR ART)*

BANDWIDTH-BASED INITIATION OF HANDOVER FOR REFERENCE SIGNAL MEASUREMENTS

TECHNICAL FIELD

The present invention generally relates to measurements of neighbor cells in a wireless communication system, and particularly relates to controlling those measurements based on the bandwidth over which the measurements are to be performed.

BACKGROUND

The availability of several techniques and devices for identifying the geographical location of mobile device users has enabled a large variety of commercial and non-commercial services, such as navigation assistance, enhanced social networking, location-aware advertising, and location-aware emergency calls. However, different services may have different positioning accuracy requirements imposed by the application. In addition, some regulatory requirements on the positioning accuracy for basic emergency services exist in some countries, such as the FCC's E-911-related requirements in the United States.

In many environments, the position of a mobile device user can be accurately estimated by using positioning methods based on GPS (Global Positioning System) or other satellite-based system. Nowadays, wireless networks are often able to provide positioning-related assistance to mobile terminals (often referred to as user equipment, or UEs, or wireless terminals, mobile stations, or simply "mobiles") to improve the terminal's receiver sensitivity and GPS start-up performance. Several of these techniques are known as Assisted-GPS positioning, or A-GPS.

GPS or A-GPS receivers may not be available in all UE, however. Furthermore, GPS is known to fail in certain indoor environments and in urban "canyons" in the radio shadows caused by tall buildings. Complementary terrestrial positioning methods, such as one approach called Observed Time-Difference-of-Arrival (OTDOA), have therefore been standardized by the 3rd-Generation Partnership Project (3GPP) and are deployed in various wireless networks. In addition to OTDOA, the 3GPP standards for the so-called Long-Term Evolution (LTE) wireless system also specify methods, procedures and signalling support for techniques called Enhanced Cell ID (E-CID) and Assisted Global Navigation Satellite System (A-GNSS). Later, a network-based technique called Uplink Time-Difference-of-Arrival (UTDOA) may also be standardized for LTE.

Three key network elements for providing location services (LCS) in an LTE positioning architecture include the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client.

Position calculation can be conducted, for example, by a UE or by a positioning server, such as an Enhanced Serving Mobile Location Center, E-SMLC, or Secure User Plan Location (SUPL) Location Platform (SLP) in LTE. The former approach corresponds to the UE-based positioning mode, whilst the latter corresponds to the UE-assisted positioning mode.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between evolved Node B (eNodeB) and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages, e.g. currently Open Mobile Alliance (OMA) LPP extensions are being specified (LPPe) to allow e.g. for operator-specific assistance data or assistance data that cannot be provided with LPP or to support other position reporting formats or new positioning methods.

A high-level architecture of such an LTE system 10 is illustrated in FIG. 1. In FIG. 1, the system 10 includes a UE 12, a radio access network (RAN) 14, and a core network 16. The UE 12 comprises the LCS target. The core network 16 includes an E-SMLC 18 and/or an SLP 20, either of which may comprise the LCS Server. The control plane positioning protocols with the E-SMLC 14 as the terminating point include LPP, LPPa, and LCS-AP. The user plane positioning protocols with the SLP 16 as the terminating point include SUPL/LPP and SUPL. Although note shown, the SLP 20 may comprise two components, a SUPL Positioning Center (SPC) and a SUPL Location Center (SLC), which may also reside in different nodes. In an example implementation, the SPC has a proprietary interface with E-SMLC, and an Llp interface with the SLC. The SLC part of the SLP communicates with a P-GW (PDN-Gateway) 22 and an External LCS Client 24.

Additional positioning architecture elements may also be deployed to further enhance performance of specific positioning methods. For example, deploying radio beacons 26 is a cost-efficient solution which may significantly improve positioning performance indoors and also outdoors by allowing more accurate positioning, for example, with proximity location techniques.

To meet varying demands for different Location-Based Services (LBS), an LTE network will deploy a range of complementing methods characterized by different performance in different environments. Depending on where the measurements are conducted and where the final position is calculated, the methods can be UE-based, UE-assisted, or network-based, each with own advantages. The following methods are available in the LTE standard for both the control plane and the user plane: (1) Cell ID (CID), (2) UE-assisted and network-based E-CID, including network-based angle of arrival (AoA), (3) UE-based and UE-assisted A-GNSS (including A-GPS), and (4) UE-assisted OTDOA.

Several other techniques such as hybrid positioning, fingerprinting positioning and adaptive E-CID (AECID) do not require additional standardization and are therefore also possible with LTE. Furthermore, there may also be UE-based versions of the methods above, e.g. UE-based GNSS (e.g. GPS) or UE-based OTDOA, etc. There may also be some alternative positioning methods such as proximity based location. UTDOA may also be standardized in a later LTE release, since it is currently under discussion in 3GPP. Similar methods, which may have different names, also exist for radio-access technologies (RATs) other than LTE, such as CDMA, WCDMA or GSM.

With particular regard to the OTDOA positioning method, this method makes use of the measured timing of downlink signals received from multiple base stations (evolved NodeBs, or eNodeBs, in LTE) at the UE. The UE measures the timing of the received signals using assistance data received from the LCS server, and the resulting measurements are used to locate the UE in relation to the neighbouring eNodeBs.

More specifically, the UE measures the timing differences for downlink reference signals received from multiple distinct locations or neighboring cells. For each (measured) neighbor cell, the UE measures Reference Signal Time Difference (RSTD), which is a relative timing difference between the neighbor cell and a defined reference cell. The UE position estimate is then found as the intersection of hyperbolas corresponding to the measured RSTDs. At least three measurements from geographically dispersed base stations with a good geometry are needed to solve for two coordinates of the UE and the receiver clock bias. In order to solve for position, precise knowledge of the transmitter locations and transmit timing offset is needed.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP. Details are specified in 3GPP TS 36.211; as of February 2011, version 10.0.0 of this specification is available from http://www.3gpp.org.

PRS are transmitted from one antenna port of a base station according to a pre-defined pattern. A frequency shift, which is a function of Physical Cell Identity (PCI), can be applied to the specified PRS patterns to generate orthogonal patterns. The mapping of frequency shifts to PCT models an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS) could be used for positioning measurements, in principle.

PRS are transmitted in pre-defined positioning sub-frames grouped by several consecutive sub-frames ($N_{PRS}$), i.e., one positioning occasion. Positioning occasions occur periodically with a certain periodicity of N subframes, i.e. the time interval between two positioning occasions. The standardized periods N are 160, 320, 640, and 1280 ms, and the number of consecutive subframes may be 1, 2, 4, or 6 [3GPP TS 36.211]. PRS configuration and PRS offset from System Frame Number 0 (SFN0) are determined by a PRS configuration index defined in [3GPP 36.211] and signalled in the OTDOA assistance data. The number of consecutive DL subframes and the PRS bandwidth (which may be smaller than the system bandwidth) may also be signalled in the OTDOA assistance data. Of course, signaling the PRS bandwidth in the assistance data is only useful if RSTD measurements are performed on PRS (as opposed to other reference signals).

PRS may also be muted, e.g., not transmitted. The positioning node informs the UE about whether PRS is muted or not, e.g., by signalling a cell-specific muting pattern which indicates PRS positioning occasions in which the UE is expected to perform measurements for the corresponding cell.

Information about such PRS and other information that will assist with positioning measurements is included in so-called assistance data. Different sets of assistance data are typically used for different methods. Regardless, the positioning assistance data is sent by the positioning server, or via some other node, to UEs or other radio nodes in order to assist with positioning measurements. For example, assistance data may be sent via LPP to an eNodeB for transmission to the UE. In this case, the transmission of assistance data may be transparent to the eNodeB and the Mobility Management Entity (MME). The assistance data may also be sent by the eNodeB via LPPa to a positioning server for further transfer to the UE. In some cases, the assistance data may be sent on request from a wireless device that needs to perform measurements. In other cases, the assistance data is sent in an unsolicited way.

Since for OTDOA positioning PRS signals from multiple distinct locations need to be measured, the UE receiver may have to deal with PRS that are much weaker than those received from the serving cell. Furthermore, without an approximate knowledge of when the measured signals are expected to arrive in time and what is the exact PRS pattern, the UE must perform signal search within a large window. This can impact the time and accuracy of the measurements as well as the UE complexity. To facilitate UE measurements, the network transmits assistance data to the UE, which includes, among other things, reference cell information, a neighbour cell list containing Physical Cell Identifiers (PCIs) of neighbour cells, the number of consecutive downlink subframes within a positioning occassion, PRS transmission bandwidth, frequency, etc.

In LPP, the OTDOA assistance data is provided within the Information Element (IE) OTDOA-ProvideAssistanceData, as shown in FIG. 2. Similar structures for OTDOA exist in LPPe.

The OTDOA assistance data includes information about the reference cell and neighbour cells for which OTDOA is to be determined. The neighbour cells may or may not be on the same frequency as the reference cell, and the reference cell may or may not be on the same frequency as the serving cell, and may or may not be the serving cell. Measurements that involve cells on a frequency different than the serving cell are inter-frequency measurements. Measurements on the same frequency as the serving cell are intra-frequency measurements. Different requirements apply for intra- and inter-frequency measurements.

Note that assistance data delivery is not required for UE- or eNodeB-assisted forms of E-CID positioning and this is not currently supported without EPDU elements. UE-based E-CID location is not currently supported, and the assistance data delivery procedure is not applicable to uplink E-CID positioning. No assistance data is currently specified for E-CID for LPP. Some assistance data, however, may be provided for E-CID e.g. via LPPe.

In this regard, with Open Mobile Alliance (OMA) LPP extension (LPPe), assistance data is enhanced with the possibility to assist a larger range of positioning methods (e.g. assistance data may also be provided for E-CID or other methods of other RATs, e.g. OTDOA UTRA or E-OTD GSM, or other PLMN networks). Furthermore, there is also a possibility of carrying over a black-box data container meant for carrying vendor-/operator-specific assistance data.

Also note that LTE specifications enable Frequency Division Duplex (FDD) and Time Division Duplex (TDD) operation modes. Additionally, half duplex operation is also specified, which is essentially FDD operation mode but with transmission and receptions not occurring simultaneously as in TDD. Half duplex mode has advantages with some frequency arrangements where the duplex filter may be unreasonable, resulting in high cost and high power consumption. Since carrier frequency number (EARFCN) is unique, by knowing it, it is possible to determine the frequency band, which is either FDD or TDD. However, it may be more difficult to find the difference between full duplex FDD and half-duplex FDD (HD-FDD) without explicit information since the same FDD band can be used as full FDD or HD-FDD.

Further, inter-frequency measurements may in principle be considered for any positioning method, even though currently not all measurements are specified by the standard as intra- and inter-frequency measurements. When performing inter-frequency measurement, the serving and target carrier frequencies may belong to the same duplex mode or to different duplex modes e.g. LTE FDD-FDD inter-frequency, LTE TDD-TDD inter-frequency, LTE FDD-TDD inter-frequency or LTE TDD-FDD inter-frequency scenario. The FDD carrier may operate in full duplex or even in half duplex mode. Examples of inter-frequency measurements currently specified by the standard are Reference Signal Time Difference (RSTD) used for OTDOA, RSRP and RSRQ which may be used e.g. for fingerprinting or E-CID.

In LTE, measurement gaps are configured by the network to enable inter-frequency measurements on the other LTE frequencies. The measurements may be done for various purposes: mobility, positioning, self organizing network (SON), minimization of drive tests, etc. Regardless, the gap configuration is signaled to the UE over the Radio Resource Control (RRC) protocol as part of the measurement configuration. A UE that requires measurement gaps for positioning measurements, e.g., OTDOA, may send an indication to the network, e.g. eNodeB, upon which the network may configure the measurement gaps. Furthermore, the measurement gaps may need to be configured according to a certain rule, e.g. inter-frequency RSTD measurements for OTDOA require that the measurement gaps are configured according to the inter-frequency requirements in 36.133, Section 8.1.2.6, e.g. not overlapping with PRS occasions of the serving carrier and using gap pattern #0.

In LTE, inter-RAT measurements (e.g., measurements on other RATs like UTRA, GSM, CDMA2000, etc) are typically defined similar to inter-frequency measurements. Indeed, they may also require configuring measurement gaps like for inter-frequency measurements. Although inter-RAT measurements often have more relaxed requirements and have more measurements restrictions, the same gap pattern is used for all types of inter-frequency and inter-RAT measurements. Therefore E-UTRAN must provide a single measurement gap pattern with constant gap duration for concurrent monitoring (i.e. cell detection and measurements) of all frequency layers and RATs.

As a special example of inter-RAT measurements there may also be multiple networks, which use the overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1× RTT Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to the positioning node (e.g. E-SMLC in LTE).

It is mandatory for all UEs to support all intra-RAT measurements (including both inter-frequency and intra-band measurements) and meet the associated requirements. However the inter-band and inter-RAT measurements are UE capabilities, which are reported to the network during the call setup. The UE supporting certain inter-RAT measurements should meet the corresponding requirements. For example a UE supporting LTE and WCDMA should support intra-LTE measurements, intra-WCDMA measurements and inter-RAT measurements (i.e. measuring WCDMA when serving cell is LTE and measuring LTE when serving cell is WCDMA). Hence network can use these capabilities according to its strategy. These capabilities are highly driven by factors such as market demand, cost, typical network deployment scenarios, frequency allocation, etc.

Notably, in single carrier LTE, a cell may operate at channel bandwidths ranging from 1.4 MHz to 20 MHz. However, a single-carrier legacy UE shall be able to receive and transmit over 20 MHz, i.e., the maximum single-carrier LTE bandwidth. If the serving-cell bandwidth is smaller than 20 MHz, then the UE shortens the bandwidth of its radio frequency (RF) front end. For example, if the serving-cell bandwidth (BW) is 5 MHz, then the UE will likewise configure its RF BW to 5 MHz. This approach has several advantages. For example, it enables the UE to avoid noise outside the current reception bandwidth, and it saves UE battery life by lowering power consumption.

However, such reconfiguration of the UE reception and/or transmission bandwidth involves some delay, e.g., 0.5-2 ms, depending on UE implementation and also on whether both UL BW and DL BW are reconfigured at the same time or not. This small delay is often referred to as 'glitch'. During the glitch the UE cannot receive from the serving cell or transmit to the serving cell. Hence this may lead to interruption in data reception or transmission from or to the serving cell. The UE is also unable to perform any type of measurements during the glitch. The glitch occurs either when the UE extends its bandwidth (e.g. from 5 MHz to 10 MHz) or when it shortens its bandwidth (e.g. from 10 MHz to 5 MHz).

Furthermore, when the UE operates at a bandwidth lower than its maximum reception capability and the UE then wants to measure over a larger bandwidth, it has to open its receiver for performing the measurement. Thus, in this case (i.e. when current BW<max BW) the glitch occurs before and after the UE obtains each measurement sample, if the UE reconfigures back to its current operation after each measurement sample over the larger bandwidth.

The glitch also occurs when a UE capable of carrier aggregation (CA) reconfigures its bandwidth from single carrier to multiple carrier mode or vice versa. For example consider a UE that is capable of CA and that supports 2 downlink (DL) component carriers (CCs), each of 20 MHz, including a primary CC (PCC) and a secondary CC (SCC). If the secondary component carrier is deactivated by the serving/primary cell then the UE will shorten its BW e.g. from 40 MHz to 20 MHz. This may cause 1-2 ms interruption on the PCC.

According to current standards, the maximum allowed measurement bandwidth on a carrier frequency is defined by the parameter Transmission Bandwidth Configuration "$N_{RB}$" in 3GPP TS 36.104, which may take values of 6, 15, 25, 50, 75 and 100 resource blocks. The DL bandwidth information of a cell is signaled in the Mater Information Block (MIB) which the UE reads before it can camp on the cell; the UL bandwidth information, if different from the DL bandwidth information, may further be signaled in System-InformationBlockType2 (SIB2) [3GPP TS 36.331].

For cell reselection, i.e., when the UE has to measure on neighbor cells, the cell re-selection parameters that are common for intra-frequency, inter-frequency and/or inter-RAT cell re-selection are signaled in SystemInformation-BlockType3 (SIB3). The element intraFreqCellReselection-Info of SIB3 contains the allowedMeasBandwidth element, which corresponds to the DL bandwidth for measurements on intra-frequency cells. If that element is absent, the DL measurement bandwidth for intra-frequency cells is assumed to be the same as that indicated by the dl-Bandwidth included in MIB. The allowed measurement bandwidth is not signaled per cell, since it is assumed to be the same as for the serving cell, which is signaled in MIB and SIB2.

The information relevant for inter-frequency cell reselection only may be signaled via SIB5, which includes cell re-selection parameters common for a frequency as well as cell specific re-selection parameters. The allowed measurement bandwidth information is signaled per frequency in the InterFreqCarrierFreqInfo element.

Thus, cell-specific bandwidth information currently is not provided for cell re-selection. Rather, bandwidth information for cell re-selection is only provided per carrier.

Other cell-specific information for cell re-selection is currently provided for intra-frequency cells or inter-frequency cells. For intra-frequency cells, the information is provided in the IntraFreqNeighCellInfo element, when a list of cells is signaled in SIB4. For inter-frequency cells, the information is provided in the InterFreqNeighCellInfo element, when a list of cells is included in InterFreqCarrierFreqInfo signaled in SIB5.

Further, a neighCellConfig element is used to indicate whether or not some configurations for a neighbor cell are the same as for the serving cell. This element with the current standard can be signaled as either a part of intraFreqCellReselectionInfo (in SIB3) or a part of InterFreqCarrierFreqInfo (in SIB5).

Note that the neighCellConfig element is used to indicate potential configuration differences among cells of a particular frequency, without cell details. Currently, the neighCellConfig element is used to provide only the information related to MBSFN and TDD UL/DL configuration of neighbour cells of such frequency. In particular, values for the neighCellConfig element include 00, 10, 01, and 11. A value of '00' indicates that not all neighbour cells have the same MBSFN subframe allocation as the serving cell on the frequency, if configured, and as the PCell otherwise. A value of '10' indicates that the MBSFN subframe allocations of all neighbour cells are identical to or subsets of that in the serving cell on this frequency, if configured, and of that in the PCell otherwise. A value of '01' indicates that no MBSFN subframes are present in all neighbour cells. Finally, a value of '11' indicates that there is a different UL/DL allocation in neighbouring cells for TDD compared to the serving cell on this frequency, if configured, and compared to the PCell otherwise. Note that, for TDD, 00, 10 and 01 are only used for the same UL/DL allocation in neighbouring cells compared to the serving cell on this frequency, if configured, and compared to the PCell otherwise.

In view of the above described details, a UE may need to measure reference signals transmitted by multiple cells, e.g., for performing positioning measurements. This proves problematic in certain circumstances. One problematic circumstance occurs when the multiple cells have different cell bandwidths. Another problematic circumstance occurs when one or more of the cells do not use the full cell bandwidth, such as when those cells are provided by beacon devices. Still another problematic circumstance occurs when the reference signals to be measured are transmitted in the multiple cells with different bandwidths (irrespective of the cell bandwidths of those cells). And yet another problematic circumstance occurs when the UE obtains different measurement bandwidth information for cells to be measured and thereby measures those cells over different bandwidths.

In all of these circumstances, the UE has to reconfigure the receiver to enable measurements of cells with a larger bandwidth, which may be necessary to meet e.g. measurement accuracy requirements with respect to those cells. This proves problematic because configuring a receiver to a larger bandwidth, to meet measurement accuracy requirements for cells with that larger bandwidth, may degrade measurement quality in other cells with either a smaller associated measurement bandwidth or with a smaller cell bandwidth. Configuring the receiver to a larger bandwidth may also prove problematic if that bandwidth is larger than the serving-cell bandwidth. Indeed, particularly where the measurements being performed are intra-frequency measurements, measuring cells over such large bandwidth degrades the quality with which the UE receives data from the serving cell over a smaller bandwidth.

Still further, positioning measurements may be performed periodically. For instance, OTDOA positioning measurements are performed in positioning subframes that occur in blocks of consecutive DL subframes and with periodicity of 160 ms, 320, 640 ms, or 1280 ms. Receiver reconfiguration to a new measurement bandwidth in certain subframes takes time, and reconfiguring it back to the normal-operation measurement bandwidth in normal subframes also takes time. This reconfiguration time reduces the total effective measurement time, which typically results in degraded measurement accuracy and/or data reception quality.

Moreover, when the network (eNodeB in LTE) configures measurement gaps for the UE to enable positioning measurements, there may also be some cells on inter-frequency(ies) or another RAT with a different transmission or measurement bandwidth of signals used for positioning. In some cases, e.g., when there are multiple frequencies and the signals for positioning occur at different time instances, the network (or eNodeB, in particular) may need to choose for which frequency the measurement gaps are to be configured.

SUMMARY

Embodiments herein advantageously recognize that the quality and/or accuracy of reference signal measurements are improved when a wireless device measures its serving cell over at least as large of a bandwidth as the bandwidth over which it measures neighbor cells. One or more embodiments herein ensure that this is the case even if the device cannot measure its current serving cell over a sufficiently large bandwidth. In this regard, the one or more embodiments hand over the device 36 to a cell with a larger measurement bandwidth than that of the device's current serving cell, so that the device can obtain higher quality reference signal measurements.

More particularly, embodiments herein include a method and apparatus for controlling measurements of cells performed by a wireless device. Processing according to the method, in particular, includes identifying, for each of a plurality of neighbor cells, a measurement bandwidth over which a particular wireless device is to perform measurements of that cell. Processing then entails selectively initiating handover of the wireless device from a serving cell to one of the neighbor cells (i.e., as a new serving cell), depending on how many of those neighbor cells have a measurement bandwidth larger than that of the serving cell. Thus, contrasted with traditional performance-based handovers that are conducted based on the strength of already made reference signal measurements, handover herein is performed based on the bandwidth(s) over which such measurements will be performed in the future.

In at least some embodiments, selective initiation of handover is conditioned on at least a majority of neighbor cells having a measurement bandwidth larger than that of the serving cell. When this is the case, the device may be handed over to one of the neighbor cells that has a measurement bandwidth larger than that of the serving cell. As a result, the embodiments guards the device against measuring most of its neighbor cells over a relatively large bandwidth while measuring its serving cell over a relatively small bandwidth.

In one or more embodiments, this bandwidth-based handover is performed so that higher quality reference signal measurements resulting from such initial handover will improve a subsequent, performance-based handover of the device. In other embodiments, though, the bandwidth-based handover is performed to determine the geographic position of the device with a greater accuracy than if the device had remained connected to the same serving cell.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 illustrates the structure of the provideAssistance-Data element in the LPP protocol.

DETAILED DESCRIPTION

Figure 1:
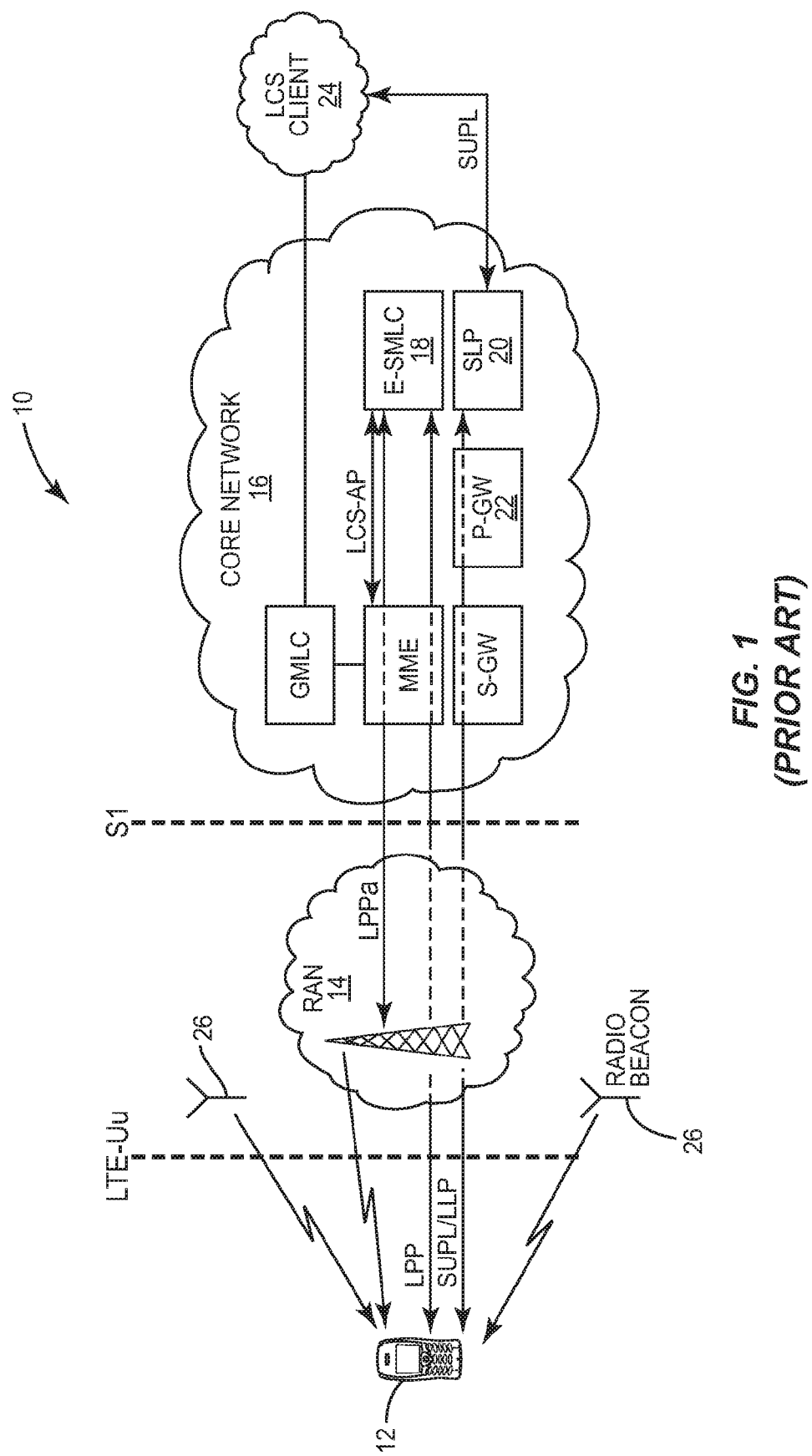
FIG. 1 illustrates components of the LTE positioning architecture.
Figure 3:
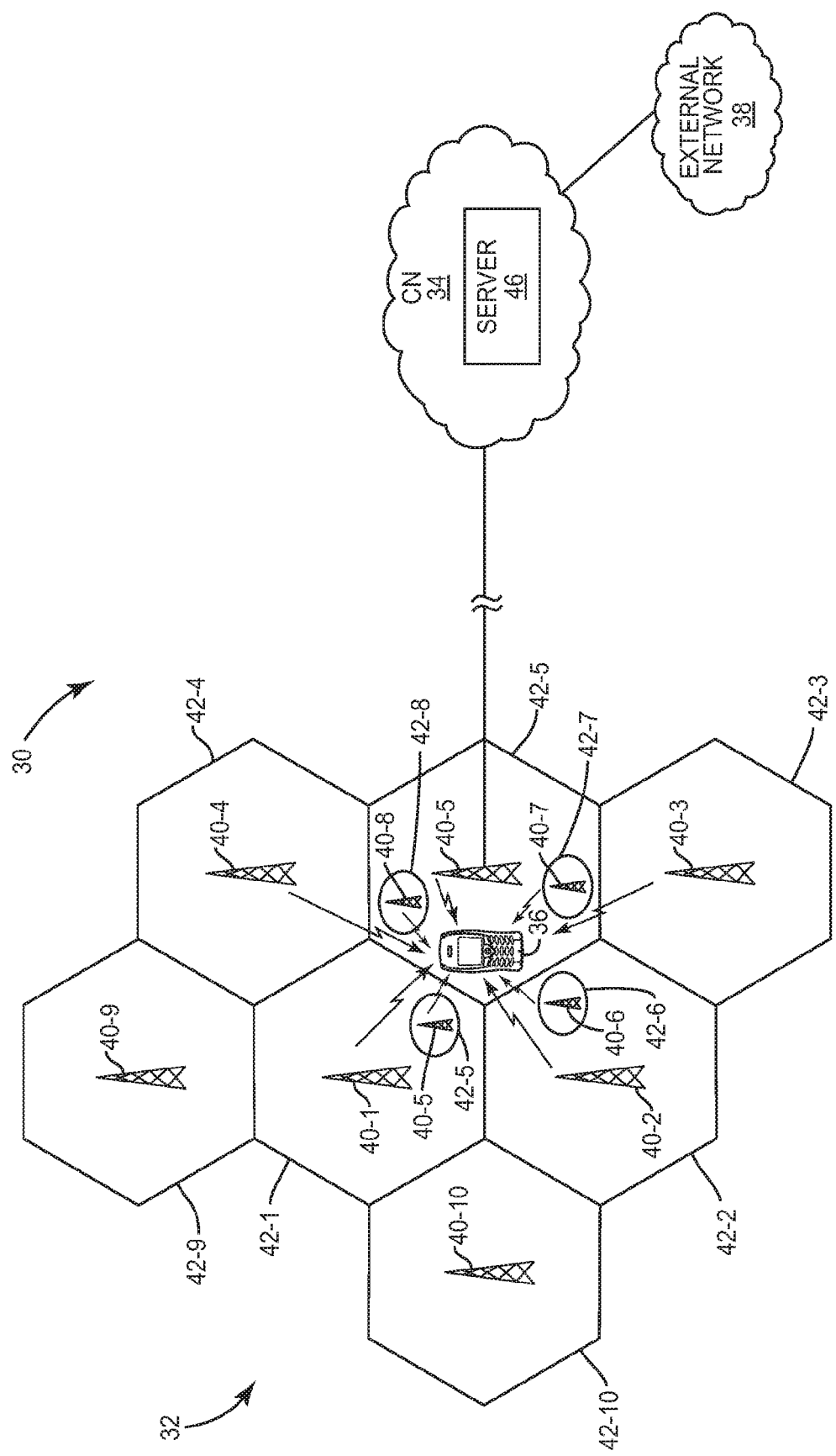
FIG. 3 is a block diagram of a wireless communication system that includes a network node configured according to one or more embodiments herein.

FIG. 3 depicts a simplified example of wireless communication system 30 according to one or more embodiments. As shown, the system 30 includes a Radio Access Network (RAN) 32, a Core Network (CN) 34, and one or more wireless devices 36. The RAN 32 and CN 36 enable a wireless device 36 to access one or more external networks 38, such as the Public Switched Telephone Network (PSTN) or the Internet.

The RAN 32 includes a number of base stations 40 that are geographically distributed across the wide geographic area served by the system 30. Each base station 40 provides radio coverage for one or more respective portions of that geographic area, referred to as cells 42. Because of this, a wireless device 36 may move within or between cells 42.

When a device 36 moves between cells 42, the device 36 is said to hand over its connection from one cell to another. Conventional handover of a device 36 is performance-based in the sense that the device 36 generally hands over from one cell to another in order to increase the device's performance (e.g., in terms of data rate). In this regard, a device 36 typically measures signals transmitted from the current cell 42 to which it is connected as well as different handover candidates. The device 36 may then hand over to the cell 42 that has the greatest signal strength.

Different cells 42 may have different nominal sizes, depending on the maximum transmit power utilized by the base stations 40 serving those cells 42. As shown, for example, base station 40-1 has a relatively large maximum transmit power and correspondingly serves wireless devices 36 within a relatively large cell 42-1, while base station 40-5 has a relatively small maximum transmit power and correspondingly serves wireless devices 36 within a relatively small cell 40-5. In general, different base stations 40 that have different pre-defined maximum transmit powers (and thereby serve cells 42 of different nominal sizes) belong to different base station classes (e.g., a macro base station class, a micro base station class, a pico base station class, etc.).

Furthermore, different cells 42 may generally be configured to operate over different predefined bandwidths, referred to herein as cell bandwidths. A given cell 42 may transmit a signal over a bandwidth smaller than its cell bandwidth, but may not transmit a signal over a bandwidth larger than its cell bandwidth.

Within this context, FIG. 3 depicts a particular wireless device 36 that, at its current position, is connected to and served by base station 40-s in the sense that the device 36 receives data from that base station 40-s. The base station 40-s transmits this data to the device 36 on a particular frequency (referred to as the serving cell frequency) and over a particular bandwidth (known as the serving-cell bandwidth). Thus, from the perspective of this wireless device 36, base station 40-s is the serving base station and cell 42-s is the serving cell. Other cells 42 that are geographically adjacent to or partially coincident with the serving cell 42-s are appropriately referred to as neighbor cells. In this simplified example, all cells 42 shown are neighbor cells except for cells 40-9 and 40-10.

Each of the cells 42 (via its base station 40) periodically transmits a so-called reference signal. A reference signal as used herein is a predetermined signal that is known to both a cell 42 transmitting that signal and a wireless device 36 receiving the signal. Reference signals transmitted by the cells 42 in this way can be measured by a wireless device 36. This process by which a device 36 measures reference signals transmitted by a cell 42 is also referred to herein, for convenience, as a device performing measurements of that cell 42. The strength of reference signal measurements may be the basis on which a device 36 conducts performance-based handover as described above, wherein the device 36 changes serving cells by handing over from one serving cell to another.

Regardless, a reference signal may be transmitted by a cell 42 on the same or a different frequency as the serving cell frequency. The device 36 may measure reference signals transmitted by neighbor cells 42 on the serving cell frequency at the same time as which the device 36 receives data from the serving cell 42-s on that frequency. Such measurements are appropriately referred to as intra-frequency measurements. Conversely, in at least some embodiments, the device 36 must measure reference signals transmitted by neighbor cells 42 on a non-serving frequency at a different time than the time at which the device 36 receives data from the serving cell 42-s on the serving frequency. These measurements may generally be referred to herein as inter-frequency measurements, although the described embodiments are equally applicable to other measurements performed on non-serving frequencies, such as inter-RAT measurements and inter-band measurements. In any case, these measurements can then used for various purposes, including for example mobility management (e.g., performance-based handover) or determining the geographic position of the device 36.

In this regard, a wireless device 36 may establish a session with a server 46 in the core network 35 for accomplishing such a purpose. This session may include one or more transactions between the device 36 and the server 46. Each transaction pertains to a particular operation, such as the exchange of capabilities, the transfer of assistance data from the server 46 to the device 36 for assisting the device 36 to perform measurements, or the transfer of information concerning the ultimate purpose of those measurements (e.g., the actual position of the device 36). Since the device 36 performs measurements in the context of such a session, the session will be referred to herein as a measurement session of the device 36.

Within any given measurement session of a device 36, the device 36 may perform measurements of different cells 42, which may not only include neighbor cells but also the serving cell. Any one of these cells 42 may serve as a so-called reference cell in the context of the measurements. In this regard, measurements performed on the reference cell serve as a reference for measurements performed on the other cells 42.

The device 36 performs measurements of neighbor cells 42 on non-serving frequencies during so-called measurement gaps. A measurement gap as used herein refers to a period of time in which the wireless device 36 performs a measurement of a neighbor cell 42 on a non-serving frequency, and does not transmit any data or otherwise communicate with the serving cell 42-s or other cell 42 on the serving-cell frequency. Within any given measurement gap, the device 36 can perform measurements on only a limited number of non-serving frequencies (typically only one at a time). To this end, the serving base station 40-s or some other radio network node in the RAN 32 configures (i.e., times or otherwise schedules) one or more measurement gaps during which the wireless device 36 is to perform such measurements on one or more non-serving frequencies.

Embodiments herein advantageously recognize that the quality and/or accuracy of reference signal measurements are improved when a device 36 measures its serving cell 42-s over at least as large of a bandwidth as the bandwidth over which it measures neighbor cells 42. One or more embodiments herein ensure that this is the case even if the device 36 cannot measure its current serving cell 42-s over a sufficiently large bandwidth. In this regard, the one or more embodiments have the device 36 hand over to a cell 42 with a larger measurement bandwidth than that of the device's current serving cell 42, so that the device 36 can obtain higher quality reference signal measurements. Thus, contrasted with traditional performance-based handovers that are conducted based on the strength of already made reference signal measurements, handover herein is performed based on the bandwidth(s) over which such measurements will be performed in the future.

Figure 4:
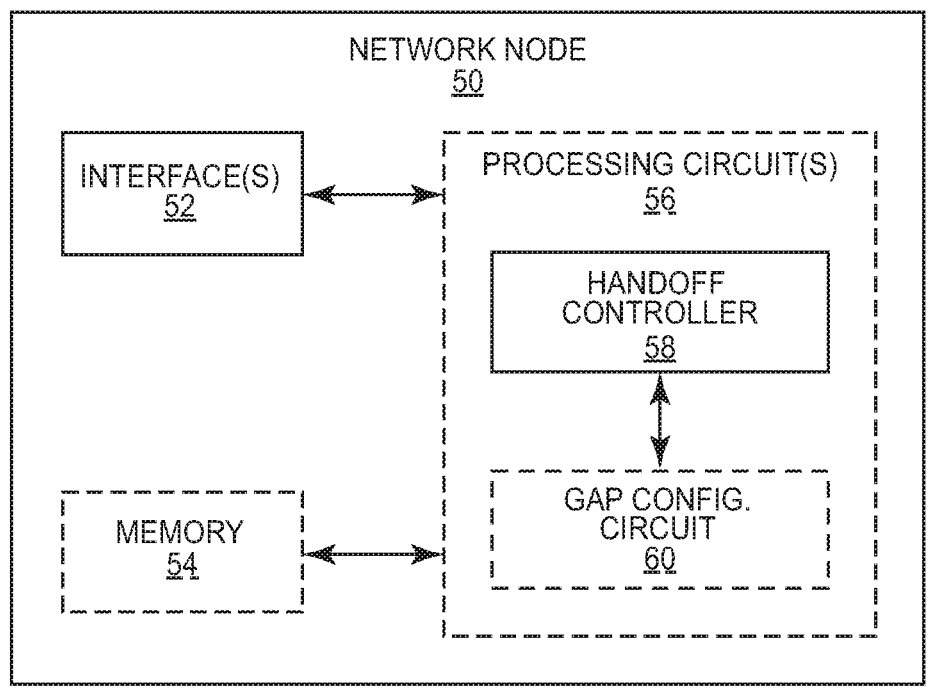
FIG. 4 is a block diagram of a network node configured according to one or more embodiments.

A node in the RAN 32 (such as one of the base stations 40, or a base station controller) may perform this intelligent handover for improving signal measurement quality. FIG. 4 correspondingly illustrates additional details of such a node, referred to generally as a network node 50.

As shown in FIG. 4, the network node 50 includes one or more communication interfaces 52, a memory 54, and one or more processing circuits 56. The one or more communication interfaces 52 may include a network interface for communicatively coupling the node 50 to other nodes in the RAN 32 or CN 34. The one or more communication interfaces 52 may further include a radio interface for communicatively coupling the node 50 to wireless devices 36.

The one or more processing circuits 56 are configured to control measurements of cells 42 performed by a wireless device 36. The one or more processing circuit 56 may functionally include a handover controller 58 configured to perform this device-specific processing. Specifically, the handover controller 58 is configured to identify, for each of a plurality of neighbor cells 42, a measurement bandwidth over which a particular wireless device 36 is to perform measurements of that cell 42. The handover controller 58 is then configured to selectively trigger or otherwise initiate handover of the wireless device 36 from a serving cell 42-s to one of the neighbor cells 42 (i.e., as a new serving cell), depending on how many of those neighbor cells 42 have a measurement bandwidth larger than that of the serving cell 42-s.

In at least some embodiments, the handover controller 58 is configured to selectively initiate handover in this way by conditioning handover on at least a predetermined number or percentage of neighbor cells 42 having a measurement bandwidth larger than that of the serving cell 42-s. When this predetermined number or percentage is set to be a majority of the neighbor cells 42, for instance, the handover controller 58 guards the device 36 against measuring most of its neighbor cells 42 over a relatively large bandwidth while measuring its serving cell 42-s over a relatively small bandwidth. The handover controller 58 thereby initiates handover to effectively change the device's serving cell, so that the device 36 can measure this new serving cell over a bandwidth similar in size to (or even larger than) the bandwidth over which it measures most other cells.

In this regard, the handover controller 58 may be configured to compare the measurement bandwidths for the different neighbor cells 42 to one another and/or to the measurement bandwidth for the serving cell 42-s, in order to determine to which neighbor cell 42 the device 36 is to be handed over. Based on this comparison, the handover controller 58 in at least one embodiment is configured, when handover is initiated, to hand over the device 36 to one of the neighbor cells 42 that has a measurement bandwidth larger than that of the serving cell 42-s. Alternatively, the handover controller 58 may handover the device 36 to the neighbor cell 42 with the maximum measurement bandwidth. In either case, though, the device 36 will be handed over to a new serving cell with a measurement bandwidth that is larger than that of the device's current serving cell 42-s and that is the same as or larger than that of at least some other cells 42 to be measured. The device 36 will then be able to obtain higher quality reference signal measurements while connected to the new serving cell.

Since the immediate purpose of the bandwidth-based handover described above was to obtain higher quality reference signal measurements, not to necessarily improve data reception performance, the handover controller 58 may initiate performance-based handover of the device 36 once those measurements have been obtained. This performance-based handover may even be made based on comparing the strengths of the reference signal measurements, and handing over the device 36 to the cell 42 with the highest measurement strength (which may be the previous serving cell 42-s or a different neighbor cell 42).

In some embodiments, this is the ultimate purpose of the handover controller's bandwidth-based handover. That is, the handover controller 58 performs a bandwidth-based handover of the device 36 so that the higher quality reference signal measurements resulting from that initial handover will improve a subsequent, performance-based handover of the device 36. In this sense, then, the measurements may be understood as being mobility measurements that are made after temporarily handing over to the cell 42 that will foster the highest quality mobility measurements.

In other embodiments, though, the handover controller 58 may ultimately perform the bandwidth-based handover for a different purpose. For example, in some embodiments, this ultimate purpose is to determine the geographic position of the device 36 with a greater accuracy than if the device 36 had remained connected to the same serving cell 42-s. In this case, the reference signals 46 are specifically designed (e.g., with good signal quality) to be a signal on which a wireless device 36 performs positioning measurements. These positioning measurements are to be used by the device 36 itself, or some server 46 in the core network 34 (e.g., a positioning node), for determining the device's geographic position. In some embodiments, for example, such positioning measurements comprise timing measurements. In such a case, a wireless device 36 may measure timing differences (e.g., RSTD or Rx-TX) between different reference signals received from different cells 42. These timing differences are then used to estimate the device's position with respect to the different cells 42.

Note that while the above embodiments have described the handover controller 58 as initiating bandwidth-based handover depending on how many neighbor cells 42 have a measurement bandwidth larger than that of the serving cell 42-s, the handover controller 58 may initiate such handover based on other criteria as well. Indeed, in at least some embodiments, the handover controller 58 identifies not only a measurement bandwidth for each neighbor cell 42, but also identifies a measurement frequency for each neighbor cell 42 (where a measurement frequency for a cell herein refers to the frequency on which a measurement of that cell is to be performed). The handover controller 58 then selectively initiates handover further depending on how many of the neighbor cells 42 have a measurement frequency different than that of the serving cell.

For example, in some embodiments, the handover controller 58 conditions handover on at least a majority of the neighbor cells 42 having a measurement frequency different than that of the serving cell 42-s. In this case, the handover controller 58 guards the device 36 against measuring most of its neighbor cells 42 on a non-serving frequency, since such measurements would be more demanding on the resources of a wireless device 36 and the system 30. The controller 58 thereby initiates handover to effectively change the device's serving cell (and, thus, serving frequency), so that the device will perform most of the measurements on a frequency that is the same as the device's serving frequency (i.e., as intra-frequency measurements). Moreover, when coupled with embodiments described above that condition handover on a majority of the neighbor cells having a measurement bandwidth larger than that of the serving cell 42-s, the handover controller 58 ensures that the device will perform most of the measurements as intra-frequency measurements over a measurement bandwidth that is similar in size to (or even smaller than) that of the device's serving cell.

Especially in embodiments that condition handover on the number of neighbor cells 42 that have a measurement frequency different than that of the serving cell 42-s, the handover controller 58 may perform the above processing for selectively initiating handover responsive to receiving a measurement gap configuration request from a device 36. Such a request requests that the network node 50 configure measurement gaps during which the device 36 can perform measurements of neighbor cells 42 on non-serving frequencies. As shown in FIG. 4, the network node 50 may include a gap configuration circuit 60 for configuring such measurement gaps. However, the gap configuration circuit 60 in these embodiments cooperates with the handover controller 60 to determine whether or not gaps should in fact be configured in accordance with the received request.

Specifically, responsive to the gap configuration circuit 60 receiving the request from the device 36, the handover controller 58 determines whether or not the device 36 is to be handed over to a new serving cell for performing the measurements, based on the above described criteria (i.e., measurement bandwidth and measurement frequency). If the handover controller 58 decides not to initiate handover of the device 36 as described above, the gap configuration circuit 60 proceeds with configuring gaps as requested. Conversely, if the handover controller 58 decides to initiate handover of the device 36, the gap configuration circuit 60 refrains from configuring the requested gaps, at least in the same way as it would have otherwise. Indeed, with the device 36 being handed over to a new serving cell, at least some of the measurements that would have been performed on non-serving frequencies during measurement gaps will instead be performed as intra-frequency measurements (i.e., gaps are no longer needed for making those measurements).

Note that the gap configuration circuit 60 may receive at least some of the information on which the handover controller 58 bases its handover decision within the gap configuration request. For example, such a request may include information that explicitly or implicitly identifies which cells 42 are to be measured. The request may even include information that identifies associated measurement bandwidths and/or measurement frequencies for those cells 42. Regardless, the gap configuration circuit 60 provides this received information to the handover controller 58 to thereby assist the controller 58 with its handover decision.

In general, though, the handover controller 58 may obtain the information on which it bases its handover decision (i.e., the cells' identities, measurement bandwidths, and/or measurement frequencies) in any number of ways. For example, in one embodiment, the handover controller 58 obtains at least some of the information by retrieving it from the network node's local memory 54. In another embodiment, the handover controller 58 obtains at least some of the information by receiving the information from the wireless device 36, another node in the RAN 32 (e.g., a base station 40), or some node in the CN 34 (e.g., an operation and maintenance node). Such reception may be via a higher-layer protocol, such as the Radio Resource Control (RRC) protocol. Moreover, the information may be accompanied by other information pertinent to the measurements, such as muting information or neighbor cell relation information.

Note that, regardless of the manner in which this information is obtained, the information may explicitly indicate the criteria on which the handover decision is made, or the handover controller 58 may indirectly deduce or otherwise determine that criteria from the obtained information. For example, in at least some embodiments, information obtained for at least one cell 42 explicitly indicates the measurement bandwidth for that cell 42. The information in this regard may include a dedicated parameter that indicates the measurement bandwidth. In other embodiments, by contrast, information obtained for at least one cell 42 explicitly indicates a transmission bandwidth over which the cell 42 is to transmit its reference signal. Yet based on an assumption that the device 36 is to measure the reference signal from that cell 42 over the full transmission bandwidth, the handover controller 58 autonomously determines that the measurement bandwidth for the cell 42 is equal to the indicated transmission bandwidth.

Those skilled in the art will therefore readily appreciate that the examples herein have been simplified in a number of respects for purposes of illustration. For example, the wireless device 36 described herein may be any wireless node capable of performing measurements of reference signals. In this regard, the wireless device 36 may be a mobile terminal (e.g., a smart phone, a personal digital assistant, a laptop, etc.), a sensor, a mobile relay, or even a small base station or fixed relay that performs reference signal measurements (e.g., for positioning at setup). In LTE embodiments where the measurements are utilized for positioning, for instance, the wireless device 36 comprises any LCS target.

Moreover, the above embodiments have not been described in the context of any particular type of wireless communication system (i.e., RAT). In this regard, no particular communication interface standard is necessary for practicing the present invention. That is, the wireless communication system 30 may be any one of a number of standardized system implementations in which a device 36 can perform reference signal measurements.

Nonetheless, as one particular example, the system 30 may implement LTE or LTE-based standards. In the context of positioning embodiments, therefore, the server 46 may comprise a positioning node that implements a positioning platform. If the platform is implemented in the user plane, the server 46 is an SLP node, and if the platform is implemented in the control plane, the server 46 is an E-SM LC node. Moreover, signaling of the positioning result between an E-SM LC node and an LCS Client may be transferred via multiple nodes (e.g., via MME and GMLC). Note also that LTE FDD and LTE TDD are considered as different RATs, and two LTE networks are also considered as two different LTE RATs. Finally, reference signals as referred to above may comprise Positioning Reference Signals (PRS) in LTE positioning embodiments.

At least in this case, the bandwidth over which PRS are transmitted (i.e., PRS transmission bandwidth) and/or measured (i.e., PRS measurement bandwidth) may be made available either in a radio node in the RAN 32, a positioning node 46 in the CN 34, or another network node (e.g., O&M or SON), and then communicated between the nodes directly or via other nodes (e.g., eNodeB may communicate with positioning node via O&M). The communication may also be between eNodeBs, e.g., over X2. The communication comprises at least PRS transmission bandwidth and/or PRS measurement bandwidth and/or other PRS information (e.g., any combination of: muting information, number of subframes, PRS periodicity, PRS offset from SFNO, or e.g. pico PRS subframe offset from a macro cell in the area).

Of course, those skilled in the art will appreciate that the various "circuits" described may refer to a combination of analog and digital circuits, and/or one or more processors configured with software stored in memory 54 and/or firmware stored in memory 54 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
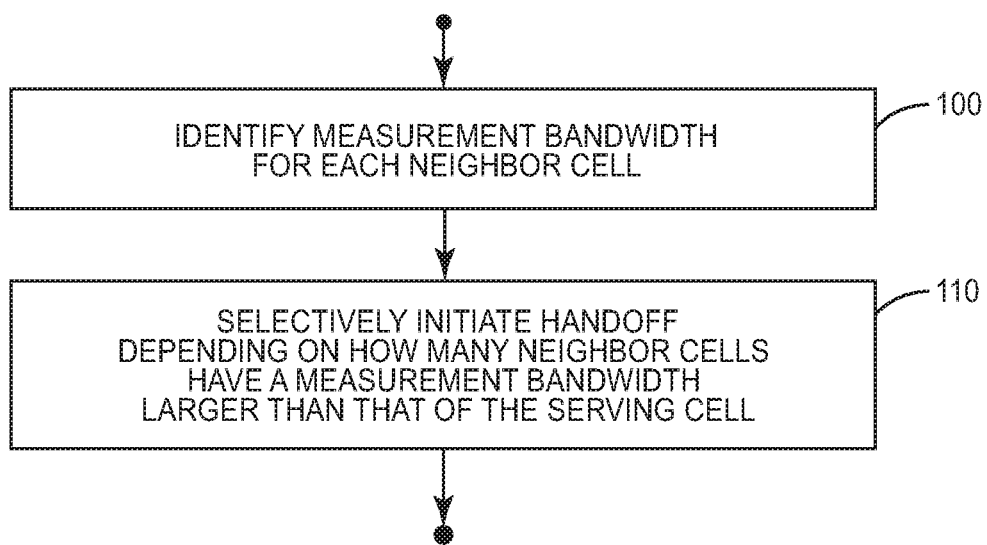
FIG. 5 is a logic flow diagram of a method implemented by a network node for controlling measurements of neighbor cells performed by a wireless device, according to one or more embodiments.

In view of the above modifications and variations, those skilled in the art will appreciate that the network node 50 described herein generally performs the processing shown in FIG. 5 for controlling measurements of cells 42 performed by a wireless device 36. As shown in FIG. 5, processing includes identifying, for each of a plurality of neighbor cells 42, a measurement bandwidth over which the device 36 is to perform measurements of that cell 42 (Block 100). Processing then entails selectively initiating handover of the wireless device 36 from a serving cell 42-s to one of the neighbor cells 42 depending on how many of those neighbor cells 42 have a measurement bandwidth larger than that of the serving cell 42-s (Block 110).

Those skilled in the art will nonetheless recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method, implemented by a network node, for controlling measurements of cells performed by a wireless device, the method characterized by:
    identifying, at the network node, for each of a plurality of neighbor cells, a measurement bandwidth over which the wireless device is to perform one or more measurements of that cell;
    at the network node, selectively initiating handover of the wireless device from a serving cell to one of the neighbor cells depending on how many of those neighbor cells have a measurement bandwidth larger than that of a serving cell.

2. The method of claim 1, wherein selectively initiating handover comprises initiating handover if at least a predetermined number or percentage of neighbor cells have a measurement bandwidth larger than that of the serving cell.

3. The method of claim 2, wherein the predetermined number or percentage is set to be a majority of the neighbor cells.

4. The method of claim 1:
    further comprising identifying, for each of the neighbor cells, a measurement frequency on which the wireless device is to perform one or more measurements of that cell;
    wherein selectively initiating handover comprises selectively initiating handover further depending on how many of those neighbor cells have a measurement frequency different than that of the serving cell.

5. The method of claim 4, wherein selectively initiating handover comprises initiating handover if at least a majority of neighbor cells have a measurement frequency different than that of the serving cell.

6. The method of claim 1, wherein, when handover is initiated, handover is initiated to one of the neighbor cells that has a measurement bandwidth larger than that of the serving cell.

7. The method of claim 1, wherein, when handover is initiated, handover is initiated to the neighbor cell with a maximum measurement bandwidth.

8. The method of claim 1, further comprising initiating performance based handover of the wireless device back to the serving cell, or to a different cell, responsive to completion of the one or more measurements.

9. The method of claim 1, wherein the identifying and the selectively initiating are performed responsive to receiving information from the wireless device that explicitly or implicitly identifies cells to be measured.

10. The method of claim 9, wherein the receiving the information from the wireless device comprises receiving the information within a request requesting that the network node configure measurement gaps during which one or more measurements of neighbor cells are to be performed on one or more non-serving frequencies.

11. The method of claim 1, wherein the identifying and the selectively initiating are performed responsive to receiving information from another network node that explicitly or implicitly identifies cells to be measured.

12. The method of claim 1, wherein the identifying comprises:
obtaining information explicitly indicating a transmission bandwidth over which at least one of the cells is to transmit reference signals;
determining that the measurement bandwidth over which the wireless device is to perform one or more measurements of that cell is equal to the transmission bandwidth.

13. The method of claim 1, wherein the identifying comprises obtaining information explicitly indicating the measurement bandwidth over which the wireless device is to perform one or more measurements of at least one of the cells.

14. The method of claim 1, wherein the one or more measurements comprise mobility measurements.

15. The method of claim 1, wherein the one or more measurements comprise positioning measurements that are to be used for determining the geographic position of the wireless device.

16. The method of claim 15:
wherein the method is implemented in a Long Term Evolution (LTE) network;
wherein the positioning measurements are performed on Positioning Reference Signals (PRS).

17. The method of claim 16, wherein the positioning measurements comprise at least one of:
Reference Signal Time Difference (RSTD) measurements for Observed Time Difference of Arrival (OTDOA) positioning;
Receive-Transmit (Rx-Tx) time difference measurements;
Timing Advance (TA) measurements;
received signal strength measurements; and
received signal quality measurements.

18. The method of claim 1:
wherein the one or more measurements comprise one or more of:
intra-frequency measurements;
inter-frequency measurements;
intra-RAT measurements;
inter-RAT measurements;
wherein an inter-frequency or inter-RAT measurement comprises either an intra-band measurement or an inter-band measurement.

19. The method of claim 1, wherein said selectively initiating handover is performed in anticipation of and in advance of the wireless device performing said one or more measurements of each of said neighbor cells.

20. The method of claim 1, wherein a measurement bandwidth is indicated as a number of resource blocks, wherein a resource block is a block of time-frequency resources.

21. A network node for controlling measurements of cells performed by a wireless device, the network node comprising:
a communications interface;
one or more processing circuits operatively connected to the communications interface;
wherein the one or more processing circuits are configured to:
identify, for each of a plurality of neighbor cells, a measurement bandwidth over which the wireless device is to perform one or more measurements of that cell;
selectively initiating handover of the wireless device from a serving cell to one of the neighbor cells depending on how many of those neighbor cells have a measurement bandwidth larger than that of a serving cell.

22. The network node of claim 21, wherein the network node is a radio node.

23. The network node of claim 21, wherein the one or more processing circuits are configured to selectively initiate handover in anticipation of and in advance of the wireless device performing said one or more measurements of each of said neighbor cells.

* * * * *